United States Patent [19]
Petrossi

[11] 3,803,066
[45] Apr. 9, 1974

[54] MODIFYING BITUMENS
[75] Inventor: Ugo Petrossi, Rome, Italy
[73] Assignee: Esso Research and Engineering Company, Linden, N.J.
[22] Filed: Feb. 22, 1971
[21] Appl. No.: 117,805

[30] Foreign Application Priority Data
Feb. 23, 1970  Italy.................................. 48768/70

[52] U.S. Cl. ........................... 260/28.5 AS, 208/44
[51] Int. Cl. ......................... C08f 45/52, B65d 5/52
[58] Field of Search ................................ 260/28.5 B

[56] References Cited
UNITED STATES PATENTS
2,686,166  8/1954  Taylor............................ 260/28.5 B
1,884,240  10/1932  Rhodes et al. ................. 260/28.5 B
2,540,651  2/1951  Bulifunt.......................... 260/28.5 B Primary Examiner—Morris Liebman
Assistant Examiner—S. L. Fox

[57] ABSTRACT

A modified bitumen is prepared by incorporating a rubber into a bitumen and co-vulcanising with sulphur at a preferred temperature range of 125°C to 145°C; the sulphur to rubber ratio being between 0.3 and 0.9. Products having improved Fraass point, softening point, ductility and kerosene-resistance are obtained.

13 Claims, No Drawings

MODIFYING BITUMENS

The present invention relates to a process for the production of a modified bitumen binding agent, and to the product obtained thereby. More especially, the invention relates to a process for producing a rubber-modified bitumen binding agent.

In recent years there has been an increasing demand for rubber-bitumen products for surface coverings, in particular road surfaces and paving; and for seal-coatings and roofing.

It has been observed that when rubberised bitumen products are employed as binding agents in road surface and paving compositions, retention of mineral aggregate, and toughness of surface, have been improved due to the increased elasticity of the binding agent. However, these rubberised binding agents are insufficiently homogeneous and too viscous, even at high temperatures, for easy working.

A number of proposals have been put forward to improve the properties of rubberised bitumen binding agents. Thus, various ways of incorporating the rubber into the bitumen have been suggested for example by adding the rubber in powder form, or as a solution, or as a latex. More recently it has been proposed to incorporate into bitumen a synthetic rubber in semi-liquid form and thereafter cure the synthetic rubber by means of known zinc oxide/organic nitrogen curing agents.

It is an object of the present invention to provide a process for producing a rubber-modified bitumen binding agent having good homogeneity, high ductility even at quite low temperatures, and viscosity which is not greatly dissimilar from the bitumen starting material employed. It is a further object to provide such a product which is especially suited for use in road-surfacing and paving compositions and which has, in addition to the aforesaid properties, good aggregate-retention and good resistance to gasoline, kerosene, and like liquid hydrocarbon materials.

According to the present invention a process for the preparation of a rubber-modified bitumen comprises the steps of:

a. blending rubber and bitumen by intimately admixing a powder or latex of a natural or a synthetic rubber, in amount giving up to 10% by weight of rubber based on weight of bitumen, either into an aqueous bitumen emulsion which emulsion is thereafter broken and water removed, or into bitumen which is at a temperature from 145°C to 185°C;

b. adjusting the temperature of the bitumen-rubber mix to within the range 125°C to 160°C;

c. intimately blending into the mix an amount of sulphur such that the weight ratio of sulphur to rubber is between 0.3 and 0.9;

d. adding a catalytic quantity of a free-radical valcanisation-accelerator; and e. maintaining the mix within the temperature range 125°C to 160°C to effect co-vulcanisation of the rubber and the bitumen.

For some end-uses of the product of this process it will be desirable to employ 3 to 10 percent of rubber (dry weight based on weight of bitumen). One major use for the product (or a composition containing it), is in surfacing roads, air-strips, gasoline-station forecourts and like transport-carrying areas. For such use it is preferred that the rubber content is not more than 3 percent by weight based on the bitumen. Very satisfactory results may be obtained in the range 0.8 to 1.2 percent.

As will be exemplified hereafter, it is essential that the weight ratio of sulphur to rubber be within the range 0.3 to 0.9, suitably the lower limit is higher, viz. 0.4 or 0.5; a preferred range for the ratio being from 0.6 to 0.8. Below this ratio the product is insufficiently co-vulcanised and has a grainy appearance and inadequate properties.

This lower limit is higher than normally employed in many known vulcanisation processes and it highlights the fact, explained in more detail hereafter, that the process of this invention is not a mere rubber polymerisation process and the product is not merely bitumen containing polymerised rubber. Surprisingly, there is a quite sharp cut-off point as the ratio increases. Beyond 0.9 the product, although appearing satisfactory when made, has poor storage stability—sulphur tending to separate.

The rubber employed may be natural or synthetic, the latter including in its scope all elastomers having a carbon to carbon double bond in their polymeric unit. The rubber can be in powder form (e.g. types known under the brand names PULVATEX, MEALARUB) but it is preferred to use a latex. A latex of synthetic rubber can be used, for example of SBR and of neoprene. In all cases the rubber employed must be in a substantially non-vulcanised state.

Any suitable form of sulphur may be employed in the process of this invention. One preferred form is an 80/85° Chancel grade having a residuum of less than 1 percent on a 325 mesh sieve. Precipitated sulphur may also be employed.

Any suitable free-radical vulcanisation accelerator may be used. Thus, organic peroxides, for example, are suitable. It is preferred, however to select an organo-sulphur compound. Amoung such are mercaptans, disulphides, dithiocarbamates and thiourams. One preferred accelerator is mercaptobenzothiazole, designated M.B.T. in the examples. A suitable grade of the latter is 95 percent purity leaving 0.05 percent on 100 mesh sieve. The accelerator is used in catalytic quantities, suitably up to 0.5 percent by wt. based on weight of bitumen. Normally it is preferred to use up to 0.3 percent, preferably 0.1 to 0.2 percent based on weight of bitumen.

Bitumens from any crude oil source, for example South America, Middle East, are suitable for use in the process of the invention. Penetration grades over a wide range can be employed, for example, 20/30; 40/50; 80/100 and 280/300. Penetration is referred to herein to mean penetration in 1/10 mm at 25°C — A.S.T.M. D5 — 49.

The rubber can be admixed with the bitumen by adding a latex to bitumen in a molten or partially molten state. Generally speaking the harder the bitumen the higher will be the temperature required for the admixing. Thus a 280/300 grade need only be heated to 145°C, whilst other grades may require heating up to about 185°C. In general, suitable ranges are from 150° to 180°C, or 155° to 180°C and 160° to 170°C. Thorough admixing can be achieved by any suitable means.

Another way of admixing the rubber and bitumen is to stir in, at ambient temperature, a latex to an aqueous emulsion of the bitumen. After thorough admixture, the emulsion is broken by the addition of a weak acid (for example acetic acid) and the water removed.

In all cases the temperature of bitumen-rubber mix is adjusted to within the temperature range 125°C to 160°C and the sulphur and accelerator are thoroughly admixed. The mixing and heating are continued for a period, possibly up to 1 hour or 2 hours or even several hours. This enables the essential reactions of the process of this invention to occur. These reactions are co-vulcanisation of the rubber and bitumen. These reactions are quite distinct from the mere vulcanisation of rubber—and the properties of the product are quite different too. This is referred to again hereafter.

Preferred temperature ranges for the co-vulcanisation step are from 125° to 145°C, or 125° to 140°C, especially 130° to 140°C.

The invention is illustrated by the following non-limitative examples, some of which contain comparative data not within the scope of the invention:

EXAMPLE 1

An 80/100 penetration grade bitumen was heated in a bath at constant temperature to 165°±5°C. A quantity of rubber latex (natural rubber latex, with a total solids content of 58–60 percent wt, and pH in the range 8–9) equal to 1 percent rubber was added slowly to the bitumen. The mixture was stirred continuously with an electric stirrer at a speed of 1400–1500 r.p.m. When the addition was complete, the temperature was lowered and kept at 135°±5°C. At that moment M.B.T. (95 percent M.B.T. with residue on 100 mesh sieve of 0.05 percent) and sulphur (sulphur 80–85 Chancel with residue on 315 mesh sieve less than 1 percent) were added in quantities of 0.2 percent and 0.8 percent respectively. Under these conditions the interlacing vulcanisation reactions took place completely in the period of one hour and a half.

EXAMPLE 2

The above example was repeated with various penetration grades of bitumen. The proportions taken were as in Example 1, the operating conditions being as shown in Table I.

TABLE I

| Penetration grade | Mixing temp. °C. (bitumen/rubber) | Co-vulcanisation Temp. °C. | Reaction time hours. |
|---|---|---|---|
| 40/50 | 180 ± 5 | 150 ± 5 | 1 |
| 80/100 | 160 ± 5 | 130 ± 5 | ¾ |
| 180/300 | 150 ± 5 | 130 ± 5 | ¾ |
| 20/30 | 180 ± 5 | 155 ± 5 | 1 |

EXAMPLE 3

Table II below shows the properties of products made in accordance with the process of the invention.

TABLE II

| Bitumen | Natural Rubber % | Sulfur % | Softening Point °C | Penetration at 25 °C | Ductility in cm.at 10 °C | Fraass Pt, °C |
|---|---|---|---|---|---|---|
| Venezuela 80/100 pen. | 0 | 0 | 45 | 80 | 42 | −19 |
| | 1 | 0.8 | 49 | 85 | 100 | −23 |
| | 1 | 0 | 52 | 70 | 32 | |
| Middle East 80/100 pen. | 0 | 0 | 47 | 85 | 11 | −18 |
| | 1 | 0.8 | 49 | 88 | 94 | −20 |
| Venezuela 40/50 | 0 | 0 | 51 | 40 | 25 | −7 |
| | 1 | 0.8 | 60 | 45 | 75 | −13 |

The table shows clearly the remarkable increase in ductility and decrease in Fraass point of the products. At the same time softening point and penetration are very little different from the starting bitumen.

EXAMPLE 4

The Table III below illustrates the properties of products made in accordance with the invention when using natural and synthetic rubbers, all in latex form. The bitumen employed was a Venezuelan 80/100 grade. The process and quantities employed were as in Example I.

TABLE III

| Type of Latex | Sulfur % | Softening Point °C | Penetration at 25 °C | Ductility cm at 10 °C | Fraass Pt, °C |
|---|---|---|---|---|---|
| Natural Rubber | — | 51 | 72 | 32 | — |
| Natural Rubber | 0.8 | 49 | 85 | >100 | −23 |
| SBR 2000 | 0.8 | 47 | 83 | 92 | −19 |
| Neoprene | 0.8 | 46 | 83 | >100 | −21 |

EXAMPLE 5

An 80/100 grade Venezuelan bitumen was treated in accordance with the invention to give two co-vulcanised paving or road-surfacing products A and B. The percent composition of products A and B was:

| | A | B |
|---|---|---|
| Bitumen | 98.1 | 98.3 |
| Sulphur | 0.8 | 0.6 |
| Natural rubber | 1.0 | 1.0 |
| M.B.T. | 0.1 | 0.1 |

The properties of Products A and B are shown in Table IV below:

TABLE IV

|  | Untreated | Product A | Product B |
|---|---|---|---|
| Penetration, 25 °C/100 gr/dmm | 80 | 85 | 86 |
| Softening Pt., °C | 45 | 49 | 49 |
| Ductility (10°C),cm. | 39 | >100 | >100 |
| Fraass Pt. (°C) | −18 | −23 | −25 |
| Thin film over test:- |  |  |  |
| (i) Penetration loss, % | 40 | 32 | 25 |
| (ii) Weight loss,% | 0.25 | 0.33 | 0.24 |

EXAMPLE 6

Table V below shows the viscosity in poises of products of the invention compared with the original bitumen which was an 80/100 pen.grade Venezuelan bitumen.

TABLE V

| Test Temperature °C | Rubberised Bitumen Natural Rubber Content 1% | Untreated Bitumen | A Typical Co-Vulcanised Bitumen of the invention (1% natural rubber) |
|---|---|---|---|
| 80 | 380    640 | 235 | 330 |
| 100 | 95    140.5 | 43.5 | 88 |

Viscosity was measured on a Rheomat 15 (Contraves) Measurement system Viscotemp MK 12.

EXAMPLE 7

A product of the types A and B of Example 5 was tested to show its suitability for use in surfacing gasoline fore-courts, airstrips, roadways etc. i.e. surfaces which have high resistance to gasoline, kerosene etc.

A Marshall sample of the product was taken and immersed in kerosene for 3 minutes. The Marshall stability was measured before and after immersion. The very satisfactory result can be observed from Table VI below.

TABLE VI

|  | Marshall Stability at 60°C before | after | Loss % |
|---|---|---|---|
| Untreated bitumen | 2100 lbs. (952.2 kg) | 800 lbs. (362.8 kg) | 62 |
| Treated bitumen | 2080 lbs. (943.5 kg) | 800 lbs (816.5 kg) | 14 |

Marshall specimens and Marshall testing are well-known techniques, fully described in the literature—for example in pp. 158–162 of "Bituminous Materials in Road Research", an official document of the U.K. Road Research Laboratory, published by H.M.S.O., 1962.

EXAMPLE 8

This example shows the critical nature of sulphur to rubber ratio in final product.

Samples of products made in accordance with the invention were compared with samples made by the same method but with different sulphur to rubber ratios.

The test is a storage stability test described in "Rubberised Asphalt for Roads", Proc.Am.Soc. Civil Engineers 84 (HW2), Paper 1651n 1-22 (May 1958):

In brief, 100 grams of test sample are put into a box of the type specified in the method ASTM D5 for penetration of bituminous materials.

The sample is heated in an oven at 130°C for 16 hours. At the end of the heating period the sample is removed from the oven and immediately stirred slowly with a spatula. The condition of the material is reported as follows:

| Ratings |  |
|---|---|
| (1) Stable: | Material is homogeneous and smooth |
| (2) Stable-granular: | Material is of unsuitable grainy appearance |
| (3) Unstable: | Material has a skin (or thin layer) on the surface indicating separation of the rubber and asphalt. |

The following Table VII shows the results obtained:

TABLE VII

|  | Sulphur to rubber ratio in product | Rating |
|---|---|---|
| (a) | <0.3 | 2 |
| (b) | 0.3 | 2, almost 1 |
| (c) | 0.6 | 1 |
| (d) | 0.8 | 1 |
| (e) | 0.9 | 1, but inferior to (d) |
| (f) | >0.9 | 3 |

It will be clear from the foregoing description and specific examples that the process of the invention gives rise to a product having very desirable properties.

The product is not a mere rubberised bitumen. Mere incorporation of rubber into bitumen is difficult because it is difficult to achieve good homogeneity. However, even when rubber is incorporated there is a sharp reduction in ductility and penetration and sharp increase in softening point compared with the original bitumen. This is well illustrated in Table II in Example 3.

Furthermore, the product is not a mere sulphurised bitumen. Sulphurising bitumen causes ductility and penetration to markedly increase; the Fraass point and softening point to decrease. This is exactly the opposite effect to that observed in a rubberised bitumen.

By means of the carefully controlled reaction conditions in the process of this invention a product is obtained in which both penetration and softening points are higher than the original bitumen. This is very surprising, for softening point and penetration usually go in opposite directions, one increasing while the other decreases. Similarly, both ductility (especially low-temperature ductility) and Fraass point are improved in comparison with the original bitumen. Again, this is unexpected because ductility and Fraass point are usually inversely proportional in the ordinary bitumens. In addition fuel resistance is much superior.

The process of the invention gives rise to co-vulcanisation. It is thought that the sulphur links to hydrocarbon molecules of the bitumen and to rubber molecules and there is also crosslinking of bitumen and sulphur and rubber.

The new chemical bonds obtained in this way are responsible for the finished product properties. Sulphur, while linking to bitumen, strongly improves the low temperature characteristics (e.g. ductility, penetration, etc.), and moreover it also promotes, through a vulcanisation process, the dispersion of the rubber.

The rubber, co-vulcanised under the conditions of this method, gives a higher tenacity to the binder and improves enormously the resistance to kerosene. The accelerator, e.g. M.T.B., reduces the reaction time and improves the storage stability at high temperature.

What is claimed is:

1. A process for the preparation of a rubber-modified bitumen comprising the steps of:
    a. blending a rubber and bitumen by intimately admixing a powder or latex of a natural or a synthetic rubber, in an amount giving up to about 10 percent by weight of rubber based on weight of bitumen, either into an aqueous bitumen emulsion which emulsion is thereafter broken and water removed, or into bitumen which is at a temperature from about 145°C to about 185°C;
    b. adjusting the temperature of the bitumen-rubber mix to within the range of about 125°C to about 160°C;
    c. intimately blending into the mix an amount of sulphur such that the weight ratio of sulphur to rubber is between about 0.3 and about 0.9;
    d. adding a catalytic quantity of a free-radical vulcanisation-accelerator; and
    e. maintaining the mix within the temperature range of about 125°C to about 160°C to effect co-vulcanisation of the rubber and the bitumen.

2. A process as claimed in claim 1, wherein the quantity of rubber introduced in step (a) is up to about 3 percent by weight rubber based on weight of bitumen.

3. A process as claimed in claim 2, wherein the said quantity of rubber is about 0.8 percent to about 1.2 percent.

4. A process as claimed in claim 1 wherein the temperatures employed in steps (b) and (e) are in the range of about 125°C to about 145°C.

5. A process as claimed in claim 4, wherein the said temperatures are in the range of about 130°C to about 140°C.

6. A process as claimed in claim 1, wherein the weight ratio of sulphur to rubber employed in step (c) is from about 0.5 to about 0.9.

7. A process as claimed in claim 6, wherein the said ratio is from about 0.6 to about 0.8.

8. A process as claimed in claim 7, wherein the free-radical compound employed in step (d) is an organo-sulphur vulcanisation accelerator, selected from the group consisting of mercaptans, organic disulphides, dithiocarbamates and thiourams.

9. A process as claimed in claim 8, wherein the organo-sulphur compound is mercaptobenzothiazole.

10. A process for the preparation of a rubber-modified bitumen comprising the steps of:
    a. blending a rubber and bitumen by intimately admixing a latex of a natural or synthetic rubber with a bitumen heated to a temperature of about 160°C to about 180°C, whereby the amount of rubber present is up to about 3 percent by weight based on weight of bitumen;
    b. cooling the bitumen-rubber mix to a temperature in the range of about 125°C to about 145°C;
    c. intimately blending into the mix an amount of sulphur to give in the mix a weight ratio of sulphur to rubber of about 0.5 to about 0.9;
    d. adding a catalytic quantity of a free radical vulcanisation accelerator; and
    e. maintaining the mix within the temperature range of about 125°C to about 145°C to effect co-vulcanisation of the rubber and the bitumen.

11. A process for the preparation of a rubber-modified bitumen comprising the steps of:
    a. blending a rubber and bitumen by intimately admixing a latex of a natural or synthetic rubber with an aqueous emulsion of bitumen, whereby the amount of rubber present is up to about 3 percent by weight based on the weight of bitumen present;
    b. breaking the emulsified mix to yield an aqueous phase and a bitumen-rubber phase;
    c. removing the aqueous phase;
    d. heating the bitumen-rubber phase to a temperature within the range of about 125°C to 145°C;
    e. intimately blending into the mix an amount of sulphur to give in the mix a weight ratio of sulphur to rubber of about 0.5 to about 0.9;
    f. adding a catalytic quantity of a free radical vulcanisation accelerator; and
    g. maintaining the mix within the temperature range of about 125°C to about 145°C to effect co-vulcanisation of the rubber and the bitumen.

12. A process as claimed in claim 10, wherein in step (c) there is employed a sulphur to rubber ratio of about 0.6 to about 0.8.

13. A process as claimed in claim 11, wherein in step (e) there is employed a sulphur to rubber ratio of about 0.6 to about 0.8.

* * * * *